United States Patent [19]

Iwashita et al.

[11] Patent Number: 5,363,943
[45] Date of Patent: Nov. 15, 1994

[54] DISK BRAKE APPARATUS FOR VEHICLE

[75] Inventors: Kanau Iwashita, Saitama; Yukimasa Nishimoto, Tokyo; Yoshiaki Sawano; Tetsuo Tsuchida, both of Saitama, all of Japan

[73] Assignee: Honda Giken Kogyo Kabushiki Kaisha, Tokyo, Japan

[21] Appl. No.: 958,213

[22] Filed: Oct. 8, 1992

[30] Foreign Application Priority Data

Oct. 15, 1991 [JP] Japan .................. 3-266399

[51] Int. Cl.⁵ .............. F16D 55/228; B60T 11/00
[52] U.S. Cl. ................ 188/72.5; 188/106 P; 188/345; 188/250 E
[58] Field of Search .......... 188/73.1, 73.2, 72.4, 188/72.5, 250 R, 250 E, 106 P, 344, 345, 370, 71.3, 71.4

[56] References Cited

U.S. PATENT DOCUMENTS

| | | | |
|---|---|---|---|
| 3,292,740 | 12/1966 | Swift | 188/72.4 X |
| 3,534,464 | 10/1970 | Lallemant | 188/2451 M X |
| 3,734,248 | 5/1973 | Fay | 188/72.4 X |
| 4,093,043 | 6/1978 | Smith | 188/72.5 X |
| 4,666,025 | 5/1987 | Rubin | 188/320 X |
| 5,168,963 | 12/1992 | Poncini | 188/106 P X |

FOREIGN PATENT DOCUMENTS

| | | | |
|---|---|---|---|
| 614125 | 2/1961 | Canada | 188/73.1 |
| 8507640 | 6/1985 | Germany . | |
| 2644718 | 3/1986 | Germany . | |
| 55-140633 | 1/1980 | Japan . | |
| 46025 | 2/1989 | Japan | 188/250 E |
| WO90/06871 | 6/1990 | WIPO . | |

*Primary Examiner*—Robert J. Oberleitner
*Assistant Examiner*—Kevin D. Rutherford
*Attorney, Agent, or Firm*—Lyon & Lyon

[57] ABSTRACT

To prevent local abrasion of a lining of a brake pad when one of a plurality of pistons for pressing the lining against a disk plate is rendered operative, a lining 16b mounted on a back plate 16a of a brake pad 16 is separated into two, and a recessed portion 26 or a gap is formed between the two linings 16b in a corresponding relationship to the position of a central one 21 of three pistons 20, 21 and 22. When the central piston 21 is rendered operative, the operating force of the piston 21 is dispersed to the left and right by the recessed portion 26 or the gap to act upon a disk plate 18, and consequently, local abrasion of the lining 16b is prevented.

3 Claims, 5 Drawing Sheets

DISK BRAKE APPARATUS FOR VEHICLE

BACKGROUND OF THE INVENTION

The field of the present invention is a disk brake apparatus for a vehicle.

In disk brakes for motorcycles having a plurality of pistons for pressing the lining of a brake pad against a disk plate, devices are known which have one of the plurality of pistons actuated when a brake pedal is operated and the other piston or pistons actuated when a brake lever is operated. Reference is made, for example, to Japanese Patent Laid-Open Application No. 55-140633. However, when, for example, only the central piston is rendered operative, the opposite end portions of the brake pad can bend backward such that local abrasion may occur only or at least excessively at the central portion of the lining.

SUMMARY OF THE PRESENT INVENTION

The present invention is directed to disk brakes of the type having a plurality of separately operable pistons for pressing against a brake pad. The brakes provide for sufficient contact area between the lining of the brake pad and a disk plate and prevent uneven wear of the lining provided on the brake pad resulting from separate operation of the pistons.

In a first aspect of the present invention, in disk brakes having a plurality of pistons for pressing a lining of a brake pad against a disk plate and a central one of the plurality of pistons being operated independently of adjacent ones of the plurality of pistons, a recessed portion is formed at that portion of the face of a lining opposed to the disk plate which corresponds to the central piston.

In a second aspect of the present invention, in disk brakes having a plurality of pistons for pressing a lining of a brake pad against a disk plate and a central one of the plurality of pistons being operated independently of adjacent ones of the plurality of pistons, the lining is made of separate elements with a gap left therebetween. These elements overlap with each other in a radial direction of the brake pad with the gap therebetween at a portion corresponding to the central piston.

In a third aspect of the present invention, in addition to the second aspect described above, the gap between the separated linings is inclined with respect to a longitudinal direction of the brake pad and a groove is formed on a face of each of the linings opposed to the disk plate such that it extends in a direction intersecting the gap.

DETAILED DESCRIPTION OF THE PREFERRED EMBODIMENTS

Figure 1:
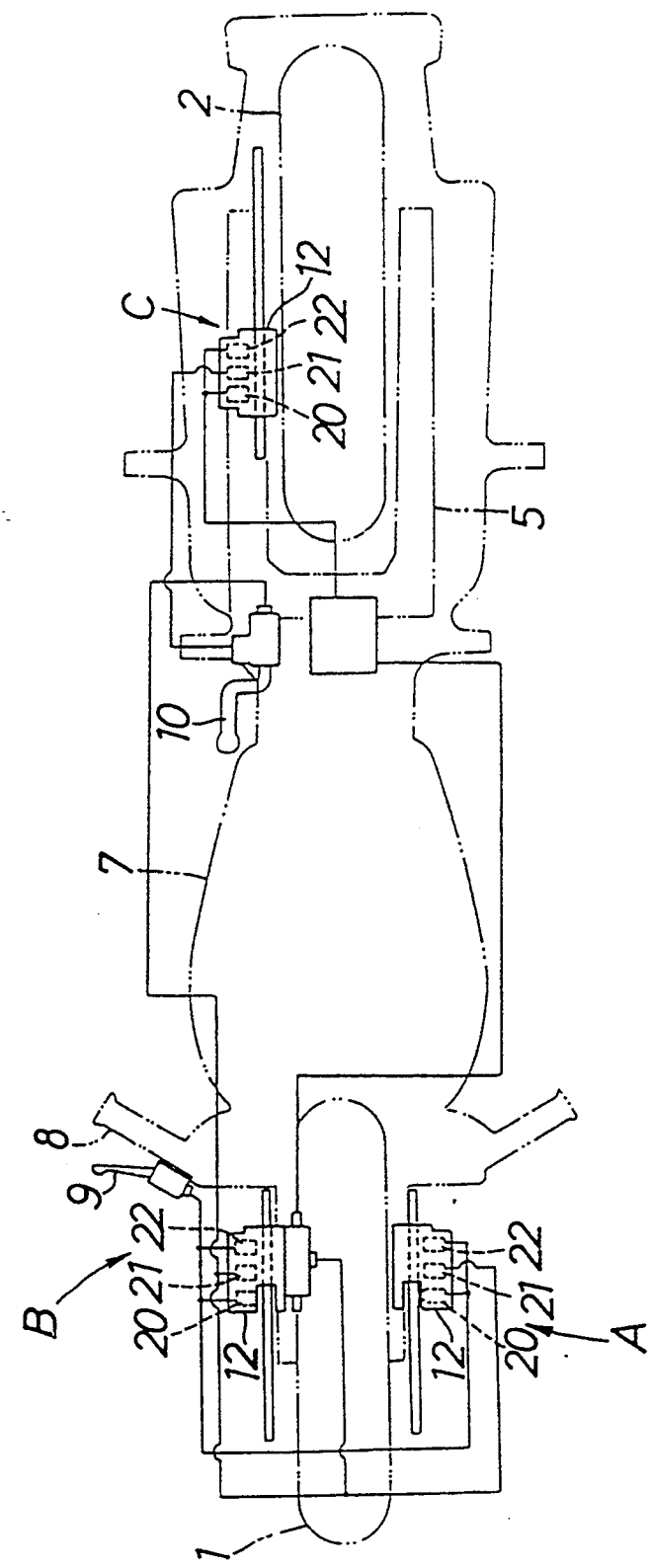
FIG. 1 is a plan view of a motorcycle.
Figure 2:
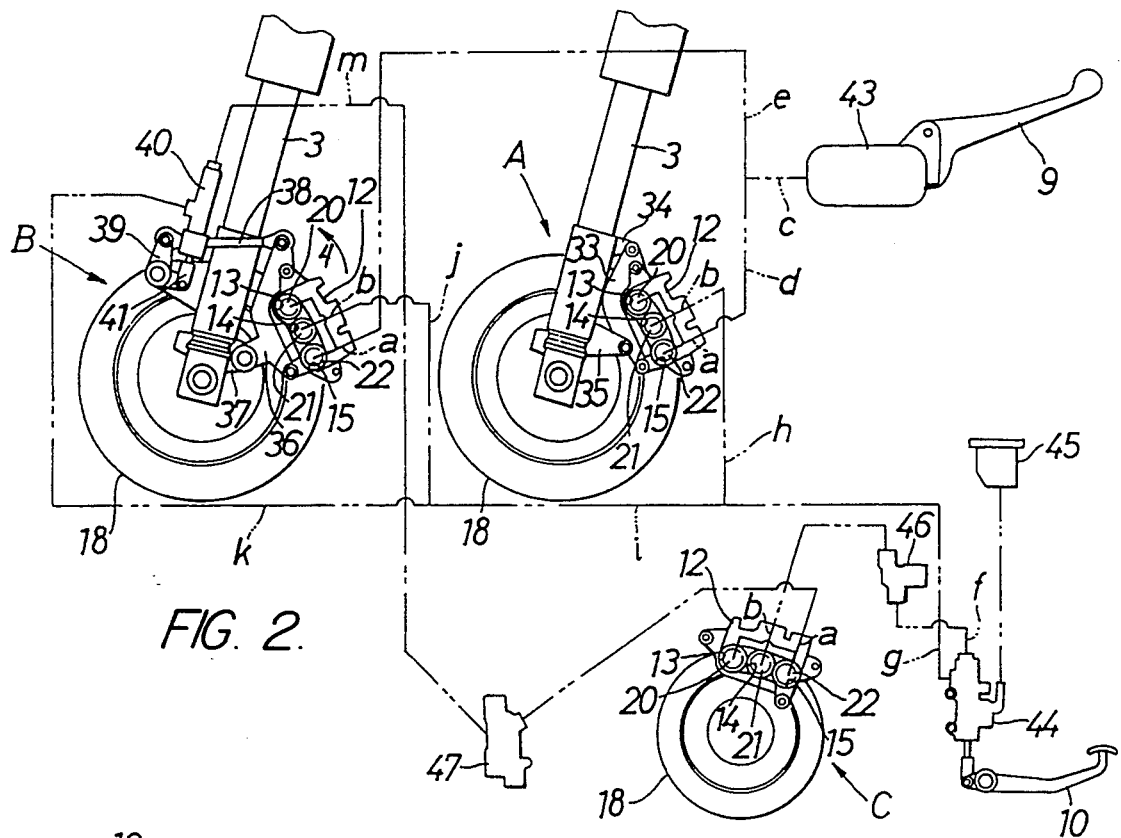
FIG. 2 is a system diagram of a brake system.

Referring to FIGS. 1 and 2, reference numeral 1 denotes a front wheel, and 2 a rear wheel, and the front wheel 1 is supported at a lower end of a front fork 3 of the inverted type while the rear wheel 2 is supported at a rear end of a rear fork 5. Reference numeral 7 denotes a fuel tank, and 8 a handlebar, and a brake lever 9 is provided on the handlebar 8 while a brake pedal 10 is provided at a lower portion of a side portion of a vehicle body.

A pair of disk brake apparatus A and B are provided on the left and right sides of the front wheel 1, respectively, and a disk brake apparatus C is provided on the right side of the rear wheel 2. It is to be noted that, in FIG. 2, the single front fork 3 is drawn from two directions for convenience's sake.

Figure 4:
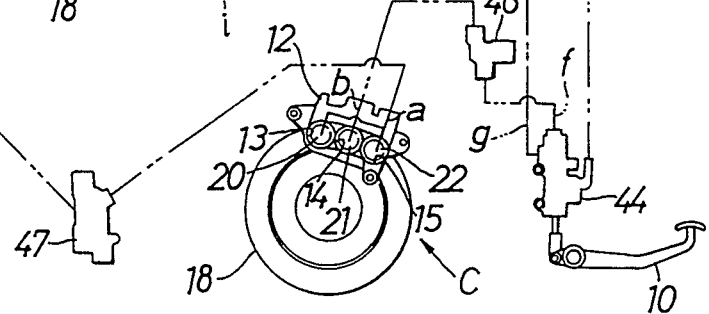
FIG. 4 is a sectional view taken along line 4—4 of FIG. 3.
Figure 4:
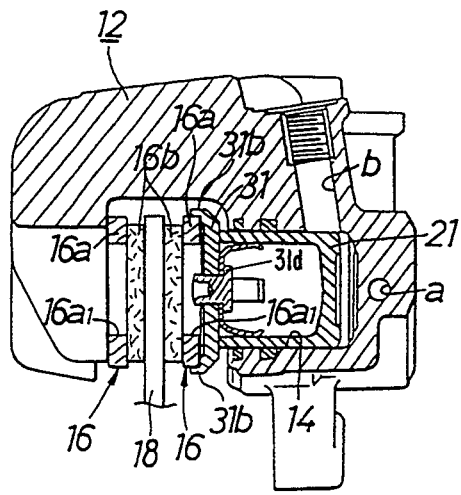
Figure 3:
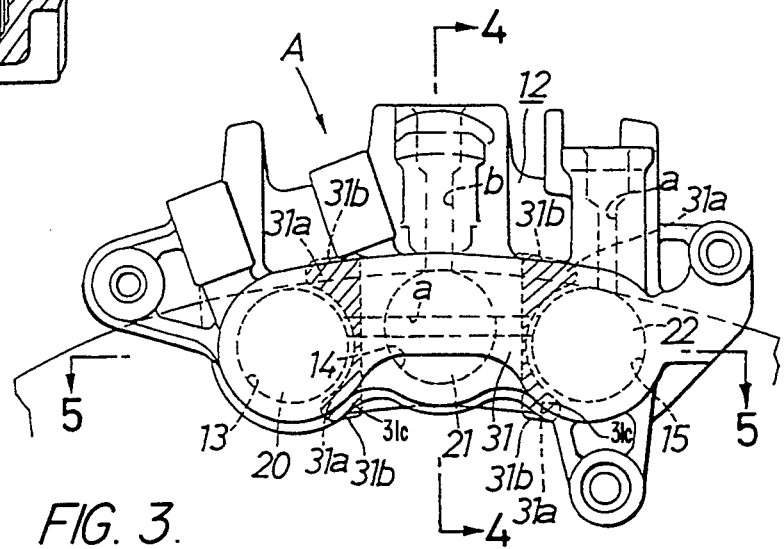
FIG. 3 is a front elevational view of a disk brake apparatus.
Figure 5:
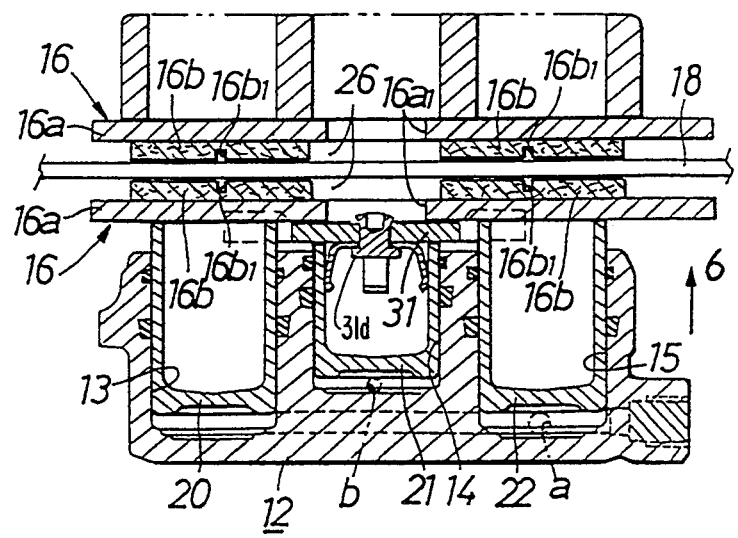
FIG. 5 is a sectional view taken along line 5—5 of FIG. 3.
Figure 6:
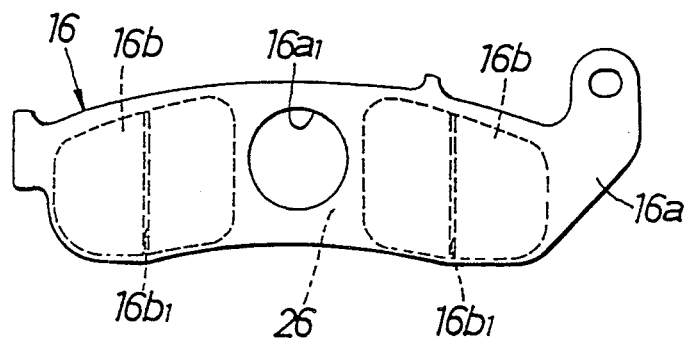
FIG. 6 is a view as viewed in the direction indicated by an arrow mark 6 of FIG. 5 of a brake pad.

Referring to FIGS. 3 to 5, reference numeral 12 denotes a caliper body, reference numerals 13, 14 and 15 denote cylinders formed on the caliper body 12, reference numeral 16 denotes a brake pad, 18 a disk plate, and reference numerals 20, 21 and 22 denote pistons provided in the cylinders 13, 14 and 15, respectively, for pressing the brake pad 16 against the disk plate 18.

The cylinders 13 and 15 are communicated with an oil passage a as shown in FIG. 5, and the cylinder 14 is communicated with another oil passage b as shown in FIG. 4.

The brake pad 16 is constituted from two divided linings 16$b$ positioned on the disk plate 18 side and a back plate 16$a$ positioned on the opposite side of the disk plate 18. A hole 16$a_1$, is formed at the center of the back plate 16$a$, and a recessed portion 26 is formed which overlies the central piston 21, and the area of the recessed portion 26 is larger than the area of the central piston 21 between the pair of linings 16$b$. A groove 16$b_1$, is formed in a direction perpendicular to the longitudinal direction of the brake pad 16 on a face of each of the linings 16$b$ opposing the disk plate 18 in order to enhance the heat radiating effect of the lining 16$b$. The grooves 16$b$ contribute also to discharging of worn out powder produced from the linings 16$b$ upon braking.

A pressing plate 31 is disposed corresponding to the hole 16$a_1$ on a face of the brake pad 16 on the piston 21 side, and the pressing plate 31 is secured to an end of the piston 21 by way of an arresting spring 31$d$. The pressing plate 31 is set such that it has a size greater than the recessed portion 26 so that part thereof is overlapped with the linings 16$b$ as viewed in plan.

Extensions 31$a$ are formed at the four corners of the pressing plate 31 as shown in FIG. 3. The extensions 31$a$ have arcuate profiles such that they evade the pistons 20 and 22, and have pressure receiving faces 31$c$ as indicated by slanting lines, and besides, side ends 31$b$ of the extensions 31$a$ are engaged with a side face of the brake pad 16 as shown in FIG. 4.

Also the structure in the caliper body 12 of each of the brake apparatus B and C is a similar structure to that of the brake apparatus A, and cylinders 13, 14 and 15, pistons 20, 21 and 22, a recessed portion 26 of a brake pad 16, oil passages a and b and so forth are provided on each of them.

By the way, the caliper body 12 of the brake apparatus A is mounted at an upper portion and a lower portion thereof on an arm 33 as shown in FIG. 2, and the arm 33 is mounted on the front fork 3 by way of a pair of brackets 34 and 35. The caliper body 12 of the brake apparatus B is mounted at an upper portion and a lower portion thereof on another arm 36, and a lower portion of the arm 36 is mounted for pivotal motion on a bracket 37. An upper portion of the arm 36 is mounted for pivotal motion at a rear end of a link 38, and a front end of the link 38 is mounted for pivotal motion on one end side of a rocking arm 39 having a V-shaped profile. The other end side of the rocking arm 39 is mounted for pivotal motion at a lower end of a piston rod 41 of a secondary master cylinder 40 disposed on the front side of the front fork 3.

In FIG. 2, reference numeral 43 denotes a master cylinder on the brake lever 9 side, 44 a master cylinder on the brake pedal 10 side, and 45 a reservoir tank, and an oil passage c extending from the master cylinder 43 is branched into two oil passages d and e. The oil passage d is communicated with the insides of the cylinders 13 and 15 of the brake apparatus A by way of the oil passage a of the brake apparatus A. Meanwhile, the oil passage e is communicated with the insides of the cylinders 13 and 15 of the brake apparatus B by way of the oil passage a of the brake apparatus B.

Two oil passages f and g extend from the master cylinder 44 on the brake pedal 10 side, and the oil passage f is communicated with the oil passage b of the brake apparatus C by way of a PCV (proportional control valve) 46 and is further communicated with the inside of the cylinder 14 by way of the oil passage b. The oil passage g is branched into two oil passages h and i, and the oil passage h is communicated with the inside of the cylinder 14 by way of the oil passage b of the brake apparatus A. Meanwhile, the oil passage i is further branched into two oil passages j and k, and the oil passage j is communicated with the inside of the cylinder 14 by way of the oil passage b of the brake apparatus B while the oil passage k is communicated with the inside of the secondary master cylinder 40.

An oil passage m extends from the secondary master cylinder 40, and the oil passage m is communicated with the oil passage a of the brake apparatus C by way of a PCV 47 and is communicated with the cylinders 13 and 15 by way of the oil passage a.

In the foregoing, if the brake lever 9 is operated, then oil flows from the master cylinder 43 into the oil passage c, and the oil flows into the oil passages a of the brake apparatus A and B by way of the oil passages d and e. The oil flowing into the oil passages a flows into the cylinders 13 and 15 to urge the pistons 20 and 22 to press the linings 16b of the brake pads 16 against the disk plates 18, whereupon the brake apparatus A and B are rendered operative so that a Ⓒbraking force is applied to the front wheel 1. On the other hand, if the brake pedal 10 is operated, then oil flows from the master cylinder 44 into the oil passages f and g. The oil flowing into the oil passage f flows into the cylinder 14 of the brake apparatus C by way of the PCV 46 and the oil passage b to urge the piston 21 to press the linings 16b of the brake pad 16 against the disk plate 18, whereupon the brake apparatus C is rendered operative so that a braking force is applied to the rear wheel 2. Meanwhile, the oil flowing into the oil passage g flows into the oil passage h and the oil passage i, and the oil flowing into the oil passage h flows into the cylinder 14 by way of the oil passage b of the brake apparatus A to urge the piston 21 so that the brake apparatus A is rendered operative. The oil flowing into the oil passage i flows into the oil passages j and k, and the oil flowing into the oil passage j flows into the cylinder 14 by way of the oil passage b of the brake apparatus B to urge the piston 21 so that the brake apparatus B is rendered operative. The oil flowing into the oil passage k flows into the secondary master cylinder 40, and the oil flows from the secondary master cylinder 40 into the oil passage m. The oil flows by way of the PCV 47 into the oil passage a of the brake apparatus C, from which it flows into the cylinders 13 and 15 to urge the pistons 20 and 22.

When the brake apparatus B is rendered operative, the caliper body 12 of the brake apparatus B is acted upon by a reactive force in the counterclockwise direction as indicated by an arrow mark 4 so that the arm 36 is rocked in the direction of the arrow mark 4 around its pivotally supported point. Upon such rocking motion, the arm 36 is moved in the leftward direction in FIG. 2, and consequently, the rocking arm 39 is rocked in the counterclockwise direction around its pivotally supported point so that the piston rod 41 of the secondary master cylinder 40 is moved upwardly. Consequently, oil flows from the secondary master cylinder 40 into the oil passage m to urge the pistons 20 and 22 of the brake apparatus C in a similar manner as described above. It is to be noted that, while the operation of the secondary master cylinder 40 is derived from two sources including oil flowing therein from the oil passage k and rocking portion of the caliper body 12, it is operated only by a greater one of them.

The piston 21 and the pistons 20 and 22 of each of the brake apparatus A, B and C belong to separate trains, and if the brake apparatus A is taken as an example, then when oil flows into the oil passage a as shown in FIG. 5, the pistons 20 and 22 are moved upwardly (in the direction indicated by an arrow mark 6) in FIG. 5, and consequently, also the brake pad 16 is moved so that the linings 16b of the brake pad 16 are pressed against the disk plate 18.

On the other hand, when oil flows into the cylinder 14 so that the piston 21 is moved upwardly (in the direction of the arrow mark 6) in FIG. 5, the brake pad 16 is moved by way of the pressing plate 31 so that the linings 16b are pressed against the disk plate 18 in a similar manner as described above.

In this manner, according to the present embodiment, since the recessed portion 26 is provided at the portion of the brake pad 16 between the pair of linings 16b corresponding to the central piston 21, only when the central piston 21 is rendered operative, the linings 16b do not exist at the portion corresponding to the piston 21, and instead, the linings 16b are abutted with the disk plate 18 at a portion of a great area at the front and rear portions of the recessed portion 26. Accordingly, even if only the central piston 21 is rendered operative, the central portions of the linings 16b of the brake pad 16 can be prevented from being locally abraded.

Figure 7:
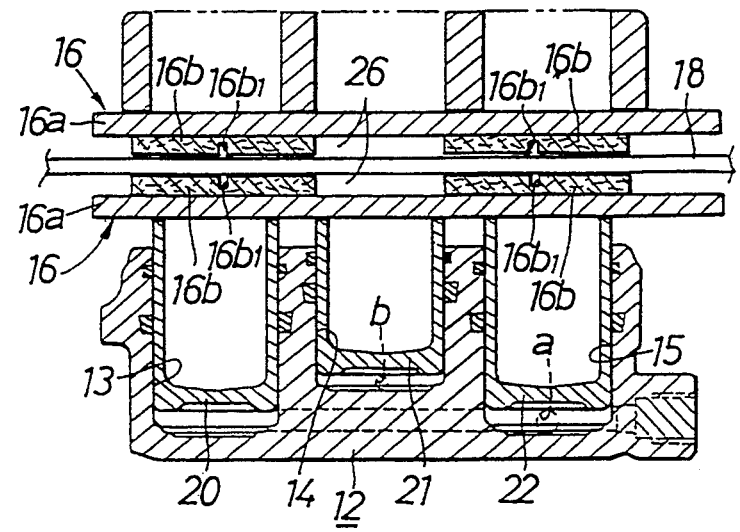
FIG. 7 is a vertical sectional view of a disk brake apparatus according to a second embodiment.

FIG. 7 shows a second embodiment of the present invention, and in the brake apparatus of the present embodiment, such a hole 16a, as in the preceding embodiment is not formed on the back plate 16a of the brake pad 16, but the piston 21 is secured directly to the back plate 16a. The structure of the other portion is similar to that in the preceding embodiment. According to such structure, the rigidity of the brake pad 16 can be enhanced.

Figure 8:
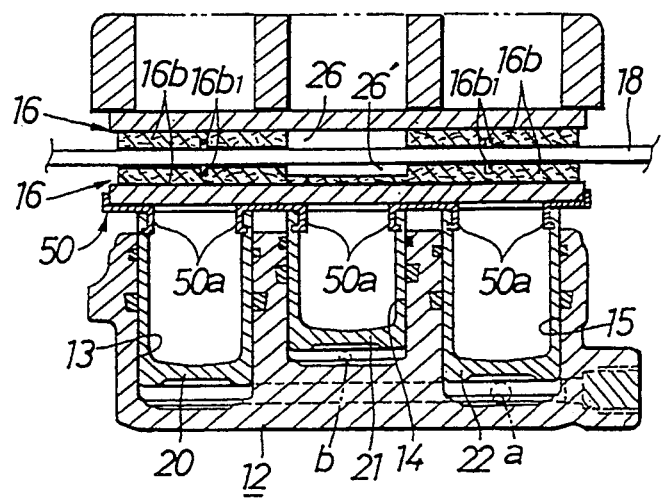
FIG. 8 is a vertical sectional view of a disk brake apparatus according to a third embodiment.
Figure 9:
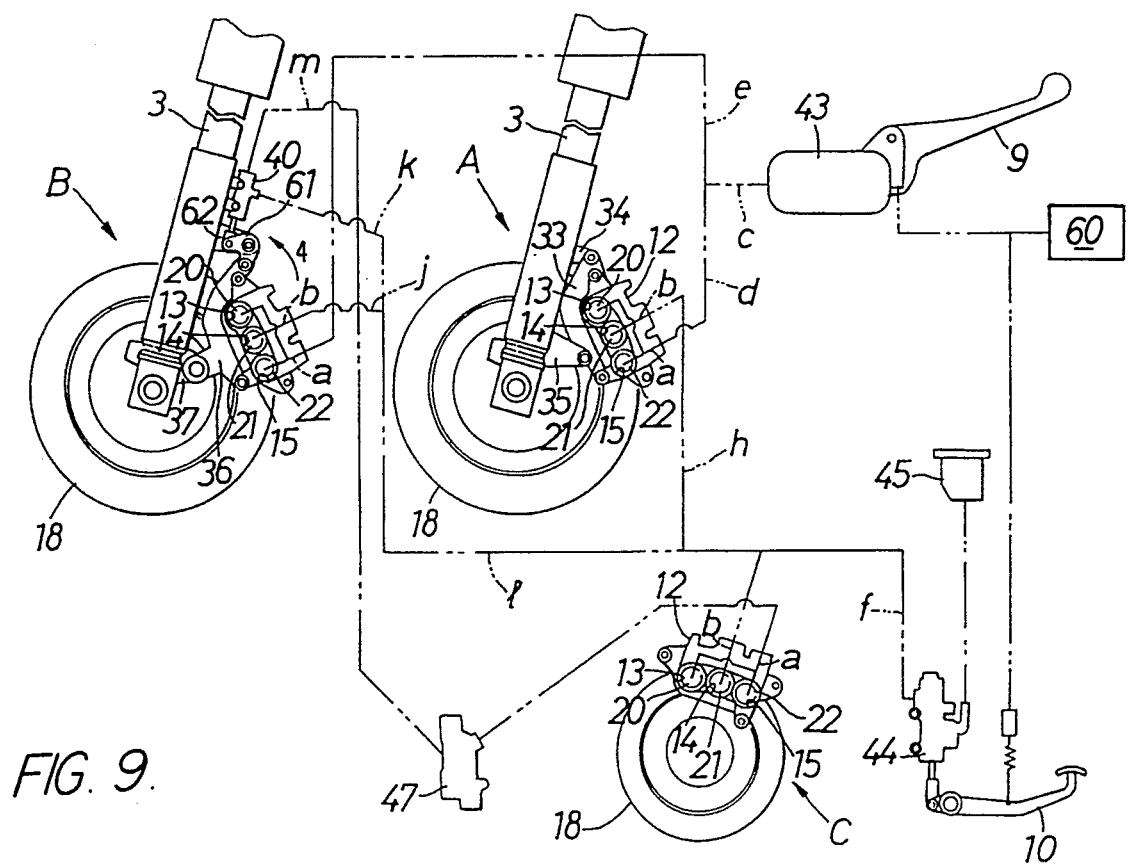
FIG. 9 is a system diagram of a brake system according to a fourth embodiment.

FIG. 8 shows a third embodiment of the present invention, and in the present embodiment, a retainer 50 is provided between the pistons 20, 21 and 22 and the brake pad 16. The back plate 16a of the brake pad 16 is secured to an upper face side of the retainer 50, and hooks 50a on a lower face side of the retainer 50 are individually engaged with the pistons 20, 21 and 22 so that, if any one of the pistons 20, 21 and 22 is rendered operative, then the linings 16b of the brake pad 16 are abutted with the disk plate 18. Further, in the present embodiment, the recessed portions 26 and 26' of a pair of brake pads 16 are formed with different depths.

FIGS. 9 to 12 show a fourth embodiment of the present invention. As apparent from FIG. 9, the brake system of the present fourth embodiment includes an inhibitor circuit 60 connected to the brake lever 9 and the brake pedal 10. The inhibitor circuit 60 is connected to an engine and is constructed such that the engine is not started unless a starter motor is rendered operative while the brake lever 9 or the brake pedal 10 is being operated.

In the fourth embodiment, the PCV 46 adopted in the first embodiment described hereinabove is omitted. This is because the point at which the PCV 46 operates so that it weakens the braking force of the rear wheel 2 is outside the range of the braking force required in ordinary braking operation and is not always necessitated in an ordinary operating condition.

Further, the secondary master cylinder 40 in the fourth embodiment is mounted on the rear face of the front fork 3 so as to protect the same from a flying stone or the like. The arm 36 and the secondary master cylinder 40 provided on the caliper body 12 of the brake apparatus B are connected to the opposite ends of an L-shaped rocking arm 61 supported for pivotal motion on a bracket 62 provided on the front fork 3. Accordingly, when the brake apparatus B is rendered operative and the caliper body 12 is rocked in the direction indicated by an arrow mark 4, the rocking arm 61 is rocked in the clockwise direction to render the secondary master cylinder 40 operative.

Figure 10:
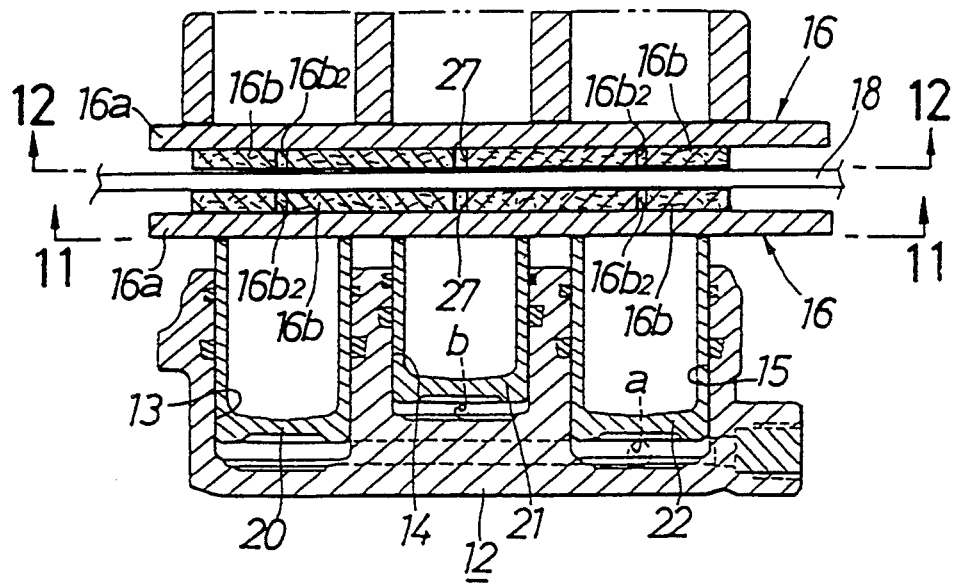
FIG. 10 is a vertical sectional view of a disk brake apparatus according to a fifth embodiment.
Figure 11:
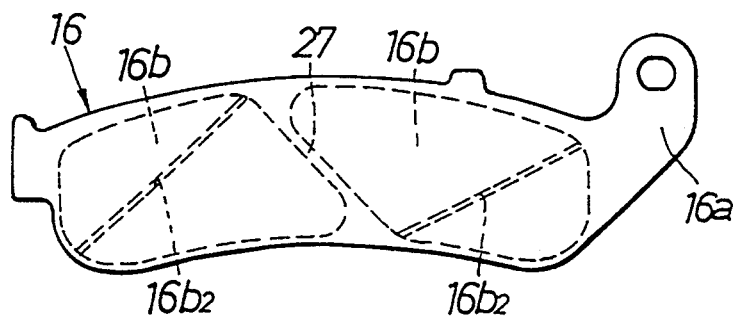
FIG. 11 is a view taken along line 11—11 of FIG. 10.
Figure 12:
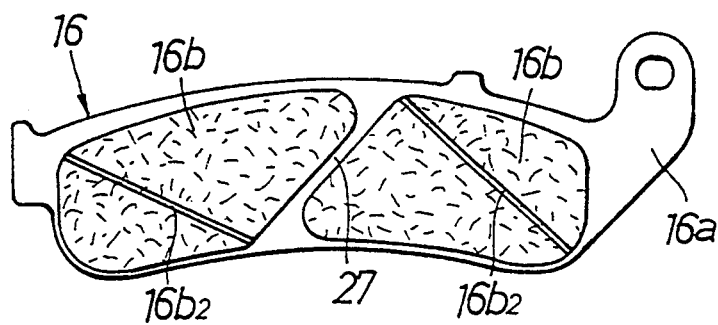
FIG. 12 is a view taken along line 12—12 of FIG. 10.

The brake pad 16 in the fourth embodiment is characterized in the linings 16b thereof as shown in FIGS. 10 to 12. In particular, the lining 16b mounted on the inner face of the back plate 16a is divided into two with a gap 27 left therebetween which is inclined by about 45 degrees with respect to a radial direction of the brake pad 16, that is, a radial direction of the wheel, and the position of the gap 27 corresponds to the central piston 21. The two divided linings 16b are arranged such that they are mutually partially overlapping in a radial direction of back plate 16a and circumferentially spaced apart. A groove $16b_2$, is formed on a face of each of the linings 16b opposing to the disk plate 18 such that it extends substantially perpendicularly to the gap 27. As apparent from FIGS. 11 and 12, the gaps 27 and the grooves $16b_2$ are formed on the linings 16b positioned on both sides of the disk plate 18 such that the inclination directions thereof cross each other.

Where the lining 16b is divided in two at a central portion thereof as described above, the tendency that the brake pad 16 is curved by an influence of thermal expansion by frictional heat upon braking can be decreased, but on the other hand, there is a problem that the rigidity of the brake pad 16 deteriorates. However, even when only the central piston 21 is rendered operative to press against a central portion of the brake pad 16, the reduction of the rigidity of the brake pad 16 is reduced because the gap 27 and the grooves $16b_2$ are inclined with respect to a radial direction of the brake pad 16, and the amount of deformation of the brake pad 16 by pressure of the piston 21 can be kept small. Consequently, the entire faces of the linings 16b are pressed against the disk plate 18 at a substantially uniform face pressure and local abrasion of the central portion of the lining 16b can be prevented. Further, since the gaps 27 and the grooves $16b_2$ of the linings 16b positioned on the opposite sides of the disk plate 18 are made different from each other, enhancement in prevention of squealing upon braking and also in draining performance can be achieved.

It is to be noted that, while, in the fourth embodiment described above, the lining 16b is divided into two with the gap 27 interposed therebetween which is inclined with respect to a radial direction, the profile of the gap 27 is not limited to a straight line but may be, for example, a kinked line along which the pair of linings 16b partially extend into each other. In summary, if the pair of separated linings 16b are disposed such that they are overlapped in a radial direction of the brake pad 16 at the location of the gap 27, then they can contribute to the assurance of the rigidity of the brake pad 16.

As described, a recessed portion may be formed at a portion of a lining of a brake pad corresponding to a central piston. Even when the central piston is rendered operative, a wide portion of the lining outside the recessed portion is abutted with a disk plate similarly as in the case wherein a pair of pistons on the opposite sides are rendered operative, and local abrasion of the lining of the brake pad can be prevented.

As also described, the lining which is separated with a gap left therebetween is overlapped in a radial direction of the brake pad with the gap held between a portion corresponding to the central piston. With this arrangement, the flexural rigidity of the brake pad may be easily assured and local abrasion of the lining of the brake pad can be prevented.

Additionally as described, the gap between the separated linings may be inclined with respect to the longitudinal direction of the brake pad and a groove formed on a face of each of the linings opposed to the disk plate such that it extends in a direction intersecting the gap. Flexural rigidity of the brake pad is further facilitated and local abrasion of the linings of the brake pad can be prevented. Further, squealing upon braking can be effectively prevented.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A disk brake apparatus for a vehicle comprising a brake disk plate; a brake pad having a lining; a brake actuator; a plurality of at least three pistons positioned to press said lining of said brake pad against said disk plate, a central one of said plurality of pistons being operated independently of adjacent ones of said plurality of pistons by said actuator; characterized in that said brake pad has a recessed portion on the portion thereof adjacent said brake disk plate which overlies said central one of said plurality of pistons, and the area of said recessed portion is larger than the area of said central one of said plurality of pistons.

2. A disk brake apparatus for a vehicle comprising a brake disk plate; a brake pad having a lining; a brake actuator; a plurality of at least three pistons positioned to press said lining of said brake pad against said disk plate, a central one of said plurality of pistons being operated independently of adjacent ones of said plurality of pistons by said actuator; characterized in that said lining is of separate elements with a gap therebetween, said separate elements being mutually partially overlapping in a radial direction of said brake disk plate and circumferentially spaced apart with said gap aligned with said central one of said plurality of pistons.

3. The disk brake apparatus of claim 2 characterized in that said gap is inclined with respect to a circumferential direction of said brake disk plate, said lining having a groove formed on each said separate element adjacent said brake disk plate and extending in a direction intersecting said gap.

* * * * *